May 4, 1965     N. N. LAREAU ET AL     3,181,443
TWO-SPEED CAMERA FOR FLASH PHOTOGRAPHY

Filed July 26, 1962     3 Sheets-Sheet 1

NORMAN N. LAREAU
RICHARD J. OLSON
INVENTORS

BY R. Frank Smith
Steve W. Grembow
ATTORNEYS

May 4, 1965  N. N. LAREAU ET AL  3,181,443
TWO-SPEED CAMERA FOR FLASH PHOTOGRAPHY
Filed July 26, 1962  3 Sheets-Sheet 3

NORMAN N. LAREAU
RICHARD J. OLSON
INVENTORS

BY R. Frank Smith
Steve W. Gremban
ATTORNEYS

United States Patent Office 3,181,443
Patented May 4, 1965

3,181,443
TWO-SPEED CAMERA FOR FLASH PHOTOGRAPHY
Norman N. Lareau and Richard J. Olson, Rochester, N.Y., assignors to Eastman Kodak Company, Rochester, N.Y., a corporation of New Jersey
Filed July 26, 1962, Ser. No. 218,193
6 Claims. (Cl. 95—11.5)

This invention relates generally to cameras, and more specifically to an improved two-speed camera for daylight and flash photography.

This application is a continuation-in-part of applicants' U.S. pending application, Serial No. 78,020, filed December 23, 1960, now Patent No. 3,051,066.

It is broadly old in the camera art to have a hinged part of the camera actuate a switch in the flash circuit to break and/or complete the circuit as the hinged part is moved between operative and inoperative positions. A camera of this general type is disclosed in British Patent No. 752,772. One of the disadvantages of this camera is that the flash circuit is always closed when the camera is operated to make an exposure, and hence any flash lamp contained therein will flash upon operation of the camera. Furthermore, in cameras of this type, the operator must manually change the shutter speed depending upon whether a daylight or flash exposure is to be made.

In the improved camera construction according to this invention, the flash reflector is provided with a hinged flash reflector door which, when moved into a closed position, opens the flash circuit so that a flash bulb may be stored in the reflector while the operator is making daylight exposures without causing the bulb to flash. On the other hand, when the door is opened, the flash circuit is closed and the lamp will flash when the operator makes an exposure. Furthermore, the door in moving between its open and closed positions automatically changes the shutter speed for the type of exposure being made. For daylight exposures, a shutter speed of, say $\frac{1}{100}$ second is desired, and for flash exposures, a slower speed, which may approximate $\frac{1}{40}$ second, is required. The higher speed minimizes the number of blurred pictures due to camera movement as the exposure is being made and the slower speed permits the use of flash photography without the need of complicated and expensive synchronizing mechanism which is necessary to accommodate a high shutter speed.

One of the primary objects of the present invention is to provide an improved camera having a flash reflector door operable, upon movement between operative and inoperative positions, to automatically close and open a switch in the flash circuit.

Another object of this invention is to provide an improved camera having means movable between operative and inoperative positions for automatically changing the shutter speed as the camera is adjusted for flash or non-flash operation.

A further object of this invention is to provide an improved camera in which the shutter speed is automatically changed between two values simultaneously with the opening and closing of a switch in the flash circuit.

Another object of this invention is to provide an improved camera having a door adapted to protect the flash reflector and any flash lamp mounted therein while daylight exposures are being made.

Still another object of this invention is to provide an improved camera in which a flash bulb may be stored in the reflector with the reflector door closed without firing the bulb while taking daylight exposures.

A still further object of the invention is the provision of an improved camera in which the insertion of a flash bulb into the reflector unit automatically changes the shutter speed.

Another object of this invention is to provide an improved camera of simple design and construction, thoroughly reliable and efficient in operation, and economical to manufacture.

The above and other objects and advantages will be apparent from the following description when read in connection with the accompanying drawings, in which.

Figure 5:
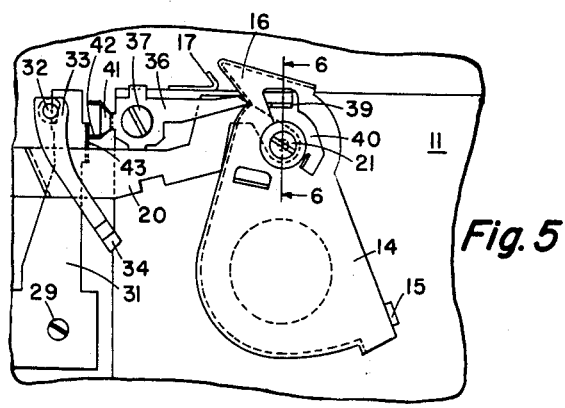
FIG. 5 is an enlarged segmental view of a portion of the structure shown in FIG. 4.

As shown in the drawings, this invention is embodied in a box-type camera 13 having a pivotal shutter blade 14 biased by a spring, not shown, into engagement with a stop 15. The shutter blade 14 has an arm 16 at one end adapted to be struck by a lever 17 as seen in FIG. 5 which imparts a clockwise swinging movement to shutter blade 14 against the bias of a spring, not shown, to make an exposure of a predetermined duration. The mechanism for striking shutter blade 14 may be of any known type, and since it does not form a part of the invention, it has not been shown or described in detail. In a pivotal, single blade shutter of this type, by properly designing striking lever 17 so that it will impart a striking force of a predetermined value, and properly designing the weight of blade 14 and the force of the shutter spring, it is possible to obtain a relative long exposure (slow shutter speed) of, say, $\frac{1}{40}$ second duration when the blade is permitted to travel freely without imposing any stop member in its path. If, on the other hand, a stop member is interposed in the path of shutter blade 14 preventing the blade from completing its full travel, a relatively short exposure (faster shutter speed) is achieved. By properly positioning the stop member, it is possible to achieve a shutter speed of, say, 1/100 second duration. As indicated earlier, the shutter speed of 1/100 second duration minimizes the number of blurred pictures due to camera movement as the exposure is being made, and the shutter speed of 1/40 second permits the use of flash photography without the need of a complicated and expensive synchronizing mechanism. These speeds are of course given merely by way of illustration.

Figure 1:
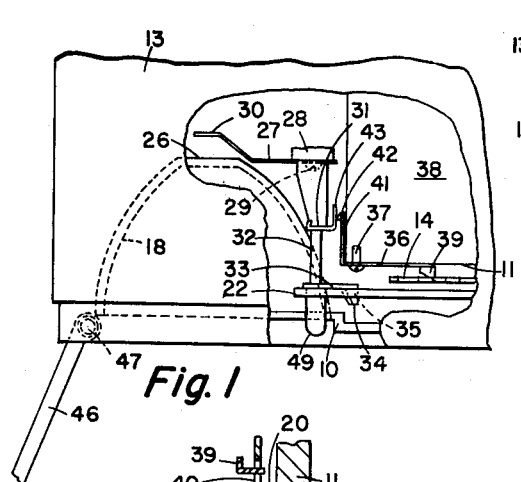
FIG. 1 is a segmental top plan view of a preferred embodiment of this invention in a camera showing the reflector door in an open position, and a switch in the flash circuit in a closed position.
Figure 2:
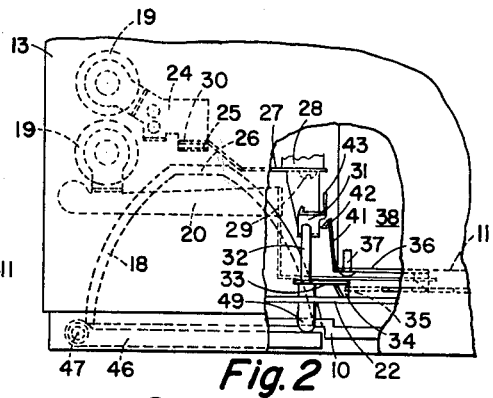
FIG. 2 is a view similar to FIG. 1 showing the reflector door in a closed position, and the switch in the flash circuit in an open position.
Figure 6:
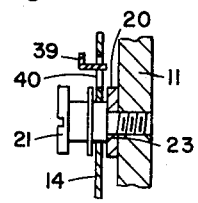
FIG. 6 is a segmental section view taken along line 6—6 of FIG. 5.
Figure 7:
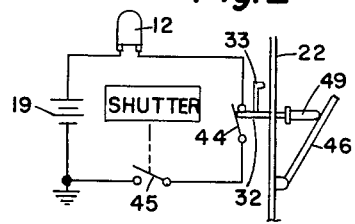
FIG. 7 is a view showing the electrical wiring diagram of the flash circuit of the camera with portions thereof shown diagrammatically.
Figure 3:
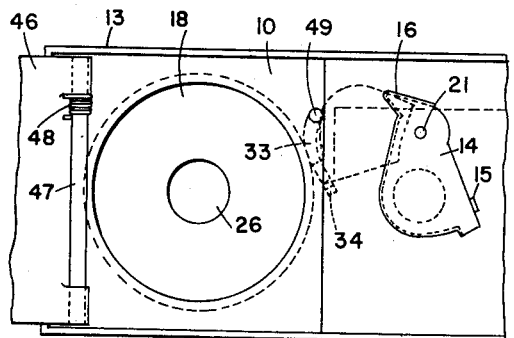
FIG. 3 is a segmental front elevation view of the camera of FIG. 1.
Figure 4:
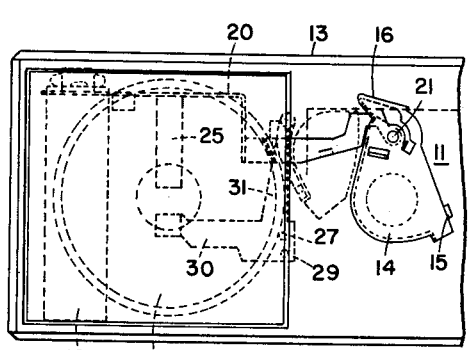
FIG. 4 is a segmental front elevation view of the camera of FIG. 2.

The box camera 13 has a flash reflector 18 of any suitable type built into the body thereof, and a pair of batteries 19 seen dotted in FIGS. 2 and 4 connected in series in the normal manner is mounted in camera 13 to the rear of flash reflector 18. A contact arm 20 of irregular shape as seen best in FIGS. 2, 4 and 5 has one end connected to an electrode of one of the batteries 19, and its opposite end mounted on a post 21 about which shutter blade 14 pivots and interposed between a camera wall 11 and a shoulder 23 formed by post 21 as seen in FIG. 6. Another contact arm 24 as seen in FIG. 2 has one end connected to an electrode of the other battery 19, and has a depending arm 25 at its other end extending behind a socket 26 of flash reflector 18 for engagement with one of the electrodes of a flash lamp 12, shown diagrammatically in FIG. 7, upon insertion of lamp 12 into socket 26. Another contact arm 27 of irregular shape as seen in FIGS. 2 and 4 is secured intermediate its ends to a shoulder 28 of camera 13 by means of cap screws 29 or the like. One end 30 of arm 27 extends behind the flash reflector socket 26 for engagement with the other electrode of flash lamp 12, and the opposite spring blade end 31 is biased into engagement with one end of a plunger 32 reciprocally carried by spaced apart walls 10, 22 of camera 13 as seeen best in FIGS. 1 and 2. The plunger 32 has an arm 33 secured thereto as seen best in FIG. 5 having a lip 34 at its free end movable into a slot 35 formed by wall 22 of camera 13. When lip 34 is seated in slot 35, as seen in FIG. 1, it is out of the path of shutter blade 14, but when it extends out of slot 35, as seen in FIG. 2, lip 34 provides a stop member for shutter blade 14 for achieving a shutter speed of 1/100 second duration. Another contact arm 36 as seen best in FIGS. 1 and 2 is secured by a screw 37 to wall 11 of a housing 38 of camera 13, and has a beveled end 39 thereof extending into an opening 40 in the upper portion of shutter blade 14 and out of contact therewith. The shutter blade 14 and end 39 form a switch 45, shown diagrammatically in FIG. 7, and upon operation of camera 13 to make an exposure, shutter blade 14 as it swings in the travel engages the beveled end 39 of contact arm 36 closing switch 45. The contact arm 36 further has a flexible portion 41 whose beveled end 42 extends into the path of a lug 43 formed by the end of contact arm 31, the portion 41 and lug 43 forming a switch 44, shown diagrammatically in FIG. 7, in the flash circuit of camera 13. The camera 13 further has a door 46 having one edge thereof pivotally mounted on a shaft 47. A torsion spring 48 encircles shaft 47 and is mounted to urge the camera door into its open position, as seen in FIG. 1. The camera 13 is further provided with a latch mechanism, not shown, for releasably holding door 46 in a closed position. One end of plunger 32 extends completely through front wall 22 of camera 13 to form a button 49 which is adapted to be engaged and depressed by door 46 as it is moved into its closed position, as seen in FIG. 2.

In the operation of this invention, when flash reflector door 46 is closed, as seen in FIG. 2, plunger 32 is depressed, urging lug 43 out of engagement with blade end 42 thereby opening switch 44 in the flash lamp circuit, and further interposing lip 34 in the path of shutter blade 14. Consequently, as long as flash reflector door 46 is closed, all of the exposures will be of 1/100 second duration, and the flash circuit will be broken so that a flash lamp may be positioned in socket 26 of flash reflector 18 without any risk of actuating or firing it so long as the door is in closed position. Should the operator desire to take a flash picture, he merely releases flash reflector door 46 which is urged by its spring 48 into the open position, as seen in FIG. 1. The spring blade end 31 then urges plunger 32 outwardly, urging lip 34 into slot 35 and out of the path of shutter blade 14, and further moves lug 43 into engagement with blade end 42 closing switch 44 of the flash circuit. In this position, upon operation of camera 13 shutter blade 14 will complete its full travel to achieve an exposure of 1/40 second duration, and as soon as shutter blade 14 engages the end 39 of contact arm 36, thereby closing switch 45 the flash circuit including flash lamp 12 is completed.

Figure 8:
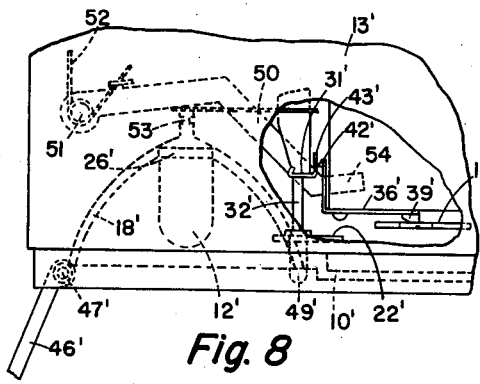
FIG. 8 is a view similar to FIG. 1 showing another modification of the invention in which the shutter speed is responsive to the insertion or removal of a flash bulb.
Figure 9:
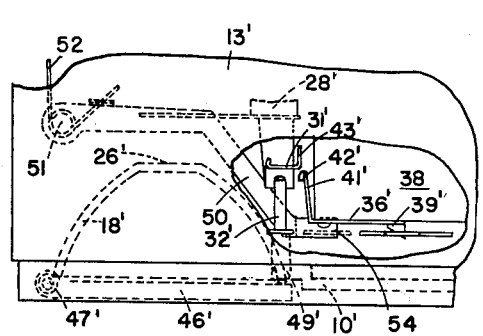
FIG. 9 is a view similar to FIG. 8 showing the camera with the flash bulb removed therefrom.
Figure 10:
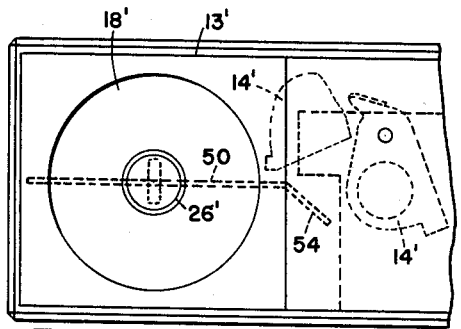
FIG. 10 is a front elevation view of the camera of FIG. 8.
Figure 11:
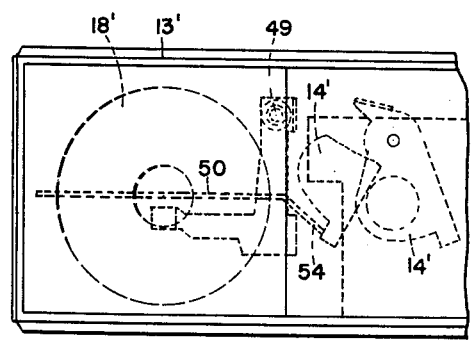
FIG. 11 is a front elevation view of the camera of FIG. 9.
Figure 12:
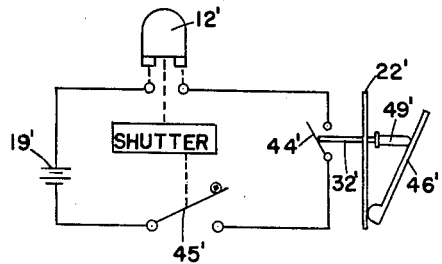
FIG. 12 is a view showing the electrical wiring diagram of the flash circuit of the camera shown in FIGS. 8–11 with portions thereof shown diagrammatically.
Figure 13:
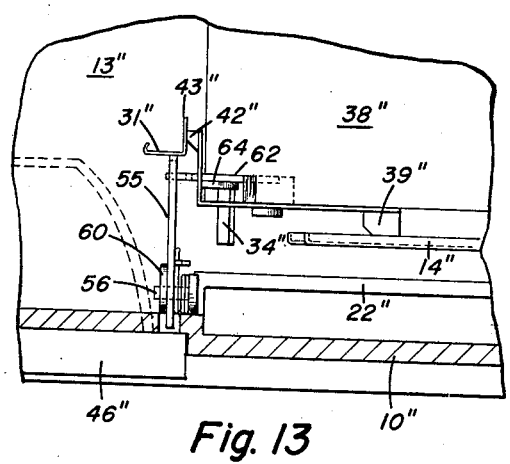
FIG. 13 is a segmental top plan view of a camera with a portion broken away to show a modified shutter stop mechanism actuable by the flash reflector door to change the shutter speed.
Figure 16:
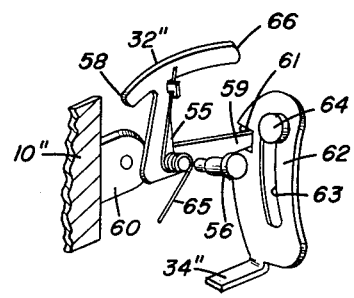
FIG. 16 is a perspective view partially exploded of the shutter stop mechanism of FIG. 13.
Figure 14:
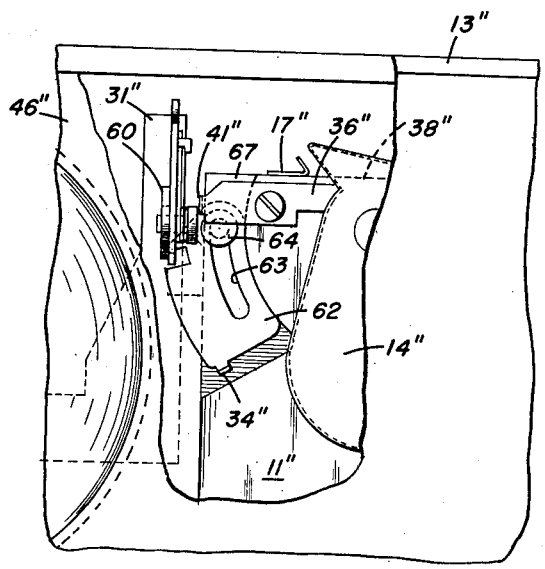
FIG. 14 is a segmental front elevation view of the structure of FIG. 13.
Figure 15:
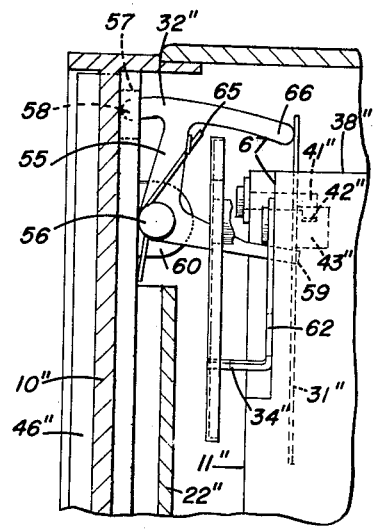
FIG. 15 is a segmental side elevation view in section taken along line 15—15 of FIG. 13.

In the modification of the invention shown in FIGS. 8–12, parts similar or identical to previously described parts will be indicated by the same number primed. In this modification, the arm 33 and lip 34 have been eliminated, and the change in shutter speed is achieved by insertion of a flash lamp 12' into socket 26' of flash reflector 18'. A lever 50 has one end thereof pivotally mounted on a stud 51 of camera 13', and is urged by a spring 52 in a clockwise direction. When flash reflector door 46' is opened and flash lamp 12' is inserted into socket 26' of flash reflector 18', as seen in FIG. 8, a portion 53 thereof engages lever 50 and urges it in a counterclockwise direction against the bias of its spring 52 withdrawing its free end 54 out of the path of shutter blade 14'. Consequently, when the camera 13' is operated to make a flash exposure, shutter blade 14' will complete its full travel achieving an exposure of 1/40 second duration. When flash lamp 12' is removed from reflector socket 26', spring 52 urges lever 50 in a clockwise direction moving its free end 54 into engagement with front wall 22' of camera 13'. In this position, free end 54 is interposed in the path of shutter blade 14' and forms a stop therefor as seen in FIGS. 9 and 11, and is properly positioned to achieve an exposure of 1/100 second duration.

In the modification of the invention shown in FIGS. 13–16, parts similar or identical to previously described parts will be indicated by the same number double-primed. In this modification, a bellcrank 55 is provided pivoted on a stud 56 of camera 13 secured to a projection 60 on camera wall 10''. The bellcrank 55 has a plunger 32'' at one end extending through an opening 57 (see FIG. 15) in wall 10'', one end 58 of which is engageable by the flash reflector door 46''. The other end 59 of bellcrank 55 extends through a notch 61 in an arcuate stop member 62 which is supported in a recess 67 in wall 11'' of housing 38'' for movement in a plane parallel to the plane of shutter blade 14'' by means of an arcuate slot 63 receiving a large headed pin 64 secured to wall 11''. The stop member 62 has a lip 34'' which extends into the path of shutter blade 14'' at all times, and it is apparent that movement of member 62 by means of bellcrank 55 will alter the position of lip 34'' in the path of blade 14'', thus changing the distance travelled by blade 14'' and hence the duration of the shutter exposure. With the flash reflector door 46'' opened, the bellcrank 55 is urged by a spring 65 in a counterclockwise direction (see FIGS. 15 and 16) positioning lip 34'' to stop blade 14'' to achieve an exposure of 1/40 second duration. When the reflector door 46'' is closed, bellcrank 55 is moved into the full line position shown in FIG. 15 positioning lip 34'' in a different position to stop blade 14'' to achieve an exposure of 1/100 second duration. In this modification, the opposite end 66 of plunger 32'' is adapted to co-operate with spring blade end 31'' for actuating switch 44'' comprising lug 43'' and flexible portion 41'' in a manner similar to that of plunger 32 disclosed in FIGS. 1–7.

The invention has been described in detail with particular reference to preferred embodiments thereof, but it will be understood that variations and modifications can be effected within the spirit and scope of the invention, as described hereinabove and as defined in the appended claims.

We claim:
1. In a flash camera, the combination comprising:
(a) a shutter mechanism including a part which moves when the shutter operates to make an exposure, and the extent of movement of which part determines the exposure speed of said shutter mechanism;
(b) flash means for said camera movable between an operative position for illuminating the subject upon making an exposure, and an inoperative position for preventing illumination of the subject upon making an exposure;
(c) a slidable member movable between two positions and including a portion lying in the path of movement of said movable part in either position and engageable by said movable part in at least one of said positions to limit the extent of movement of said part and thereby achieve shutter speeds of different duration in said respective positions; and
(d) means interconnecting said slidable member and flash means for moving said slidable member into one of said two positions in response to movement of said flash means from one of its positions to the other.

2. The invention according to claim 1 wherein said interconnecting means comprises a pivotal bellcrank having one end connected to said slidable member, and its opposite end connected to said flash means.

3. The invention according to claim 1 wherein said flash means comprises a flash reflector unit for receiving a flash lamp, and a flash reflector door movable between an open position exposing said flash reflector and a closed position covering said reflector, and said interconnecting means is engaged and moved by said door for moving said slidable member to one of its two positions upon movement of said door to its closed position.

4. The invention according to claim 3 wherein said interconnecting means comprises a pivotal bellcrank having one end connected to said slidable member, and its opposite end engageable and movable by said door upon movement of said door to its closed position.

5. The invention according to claim 1 wherein said flash means comprises a flash reflector unit for receiving a flash lamp, a flash circuit including a switch, and a flash reflector door movable between an open position exposing said flash reflector and a closed position covering said reflector, and said interconnecting means comprises a pivotal bellcrank having one end connected to said slidable member, and its opposite end having a first portion thereof connected to said switch, and a second portion engageable and movable by said door upon movement of said door to its closed position.

6. The invention according to claim 5, and further including a spring for biasing said bellcrank in a direction urging said second portion toward said door.

References Cited in the file of this patent
UNITED STATES PATENTS
2,967,469    Lachaize  _____ Jan. 10, 1961